(12) United States Patent
Wan

(10) Patent No.: US 10,762,145 B2
(45) Date of Patent: Sep. 1, 2020

(54) QUERY CLASSIFIER

(71) Applicant: TARGET BRANDS, INC., Minneapolis, MN (US)

(72) Inventor: Howard Wan, Waltham, MA (US)

(73) Assignee: Target Brands, Inc., Minneapolis, MN (US)

(*) Notice: Subject to any disclaimer, the term of this patent is extended or adjusted under 35 U.S.C. 154(b) by 876 days.

(21) Appl. No.: 15/395,525

(22) Filed: Dec. 30, 2016

(65) Prior Publication Data

US 2017/0193115 A1    Jul. 6, 2017

Related U.S. Application Data

(60) Provisional application No. 62/272,875, filed on Dec. 30, 2015.

(51) Int. Cl.
*G06F 16/951*    (2019.01)
*G06F 16/28*    (2019.01)

(52) U.S. Cl.
CPC .......... *G06F 16/951* (2019.01); *G06F 16/285* (2019.01)

(58) Field of Classification Search
CPC .................................................... G06F 16/285
USPC ....................................................... 707/706
See application file for complete search history.

(56) References Cited

U.S. PATENT DOCUMENTS

| | | | |
|---|---|---|---|
| 7,349,896 B2 * | 3/2008 | Chowdhury | .......... G06F 16/954 |
| 7,472,113 B1 | 12/2008 | Watson et al. | |
| 7,603,348 B2 * | 10/2009 | He | .................... G06F 16/24575 |
| 7,613,687 B2 | 11/2009 | Nye | |
| 8,041,733 B2 | 10/2011 | Rouhani-Kalleh | |
| 8,122,016 B1 * | 2/2012 | Lamba | ..................... G06F 11/30 |
| | | | 707/723 |
| 8,145,636 B1 * | 3/2012 | Jeh | ........................ G06F 16/353 |
| | | | 707/736 |
| 8,315,849 B1 * | 11/2012 | Gattani | ................ G06F 16/353 |
| | | | 704/2 |
| 8,370,319 B1 * | 2/2013 | Krynski | .............. G06F 16/3349 |
| | | | 707/706 |
| 8,458,213 B2 | 6/2013 | Edmonds et al. | |
| 8,560,539 B1 * | 10/2013 | Engebretsen | ......... G06F 16/355 |
| | | | 707/736 |
| 8,631,002 B2 | 1/2014 | Suresh et al. | |

(Continued)

OTHER PUBLICATIONS

Lee, Juhnyoung, et al. "Visualization and analysis of clickstream data of online stores for understanding web merchandising." Data mining and knowledge discovery 5.1-2 (2001): 59-84. (Year: 2001).*

*Primary Examiner* — Mohsen Almani
(74) *Attorney, Agent, or Firm* — Hamre, Schumann, Mueller & Larson, P.C.

(57) ABSTRACT

A computer-implemented method for processing a query is disclosed. The method includes receiving, by a server, a query from a user device over a network, the query including one or more keywords; classifying, by the server, the query into one or more categories based on the one or more keywords of the query; determining, by the server, a confidence indicator associated with each of the one or more categories from the classifying; and modifying the query to boost the one or more categories when the confidence indicator associated with the one or more categories for one or more of the keywords of the query is greater than or equal to a confidence level threshold.

20 Claims, 3 Drawing Sheets

(56) References Cited

U.S. PATENT DOCUMENTS

| | | |
|---|---|---|
| 8,719,192 B2 | 5/2014 | Ji et al. |
| 8,719,249 B2 * | 5/2014 | Bennett ................. G06F 16/353 |
| | | 707/708 |
| 8,996,495 B2 * | 3/2015 | Rehman ............ G06F 16/24578 |
| | | 707/706 |
| 9,767,417 B1 * | 9/2017 | Hoover .................... G06N 7/02 |
| 2003/0217052 A1 | 11/2003 | Rubenczyk et al. |
| 2004/0098229 A1 * | 5/2004 | Error .................... H04L 67/143 |
| | | 702/186 |
| 2005/0246332 A1 * | 11/2005 | Wang .................... G06F 16/951 |
| 2008/0097982 A1 * | 4/2008 | Gupta ................... G06F 16/951 |
| 2009/0076927 A1 | 3/2009 | Sridhar et al. |
| 2010/0293179 A1 * | 11/2010 | Chaudhuri ............ G06F 16/951 |
| | | 707/759 |
| 2011/0078127 A1 * | 3/2011 | Lin ........................ G06F 16/951 |
| | | 707/706 |
| 2011/0131157 A1 * | 6/2011 | Iyer .................... G06Q 30/0251 |
| | | 706/12 |
| 2014/0143254 A1 | 5/2014 | Datta et al. |
| 2014/0324847 A1 * | 10/2014 | Tholiya ............... G06F 16/2455 |
| | | 707/725 |
| 2014/0324852 A1 * | 10/2014 | Tholiya ................ G06F 16/951 |
| | | 707/731 |
| 2014/0324853 A1 * | 10/2014 | Tholiya ............. G06F 16/24578 |
| | | 707/731 |

* cited by examiner

QUERY CLASSIFIER

FIELD

This disclosure relates generally to query classifying. More specifically, the disclosure relates to a method and process for classifying a query for improving speed and accuracy of search results in a search engine.

BACKGROUND

Consumers purchase products in retail stores and via retail websites accessible from the Internet. Shopping via a retail website allows consumers to interact with pictures, videos, and/or audio clips relating to the products the consumer is contemplating purchasing. Often, shopping via the retail website allows the consumer to read reviews by other consumers, search for related products, and search for products that other consumers bought at the same time, or the like. In some instances, the inventory of products available from a retailer through the retail website can be different from the products available at the retail store.

Improved ways to enhance a consumer's shopping experience are desirable.

SUMMARY

This disclosure relates generally to query classifying. More specifically, the disclosure relates to a method and process for classifying a query for improving speed and accuracy of search results in a search engine.

In an embodiment, a query classifier can be used to predict multiple categories and/or sub-categories for a query, ranking the categories and/or sub-categories based on a confidence indicator. The ranking of categories and sub-categories can be provided to the search engine such that a category or sub-category with a relatively higher confidence indicator can be searched first, followed by categories or sub-categories with relatively lower confidence indicators. This can, for example, lead to a search result set that includes results that are relatively more relevant to the search query first, with relatively less relevant search results being returned at a later part of the search results. In an embodiment, providing the more relevant search results to a website visitor first can, for example, lead to an increased level of sales.

In an embodiment, a confidence indicator can be normalized to, for example, lead to a mixing of search results when the query classifier identifies multiple categories having confidence indicators that are the same or substantially similar. Normalizing the confidence indicator can, for example, include bringing a confidence indicator for a particular category into alignment with the other confidence indicators.

In an embodiment, the query classifier can predict a confidence indicator for each category and sub-category. In such an embodiment, a query can be hierarchically classified separately based on the category and sub-category identified.

In an embodiment, the query classifier can be triggered based on a number of words in a query and the confidence indicator. This can, for example, increase relevancy of a result set for queries having a variety of numbers of words. In an embodiment, if the confidence indicator does not satisfy a threshold confidence level, the query classifier may not be applied.

A computer-implemented method of processing a query is also disclosed. The method includes receiving, by a server, a query from a user device over a network, the query including one or more keywords; classifying, by the server, the query into one or more categories based on the one or more keywords of the query; determining, by the server, a confidence indicator associated with each of the one or more categories from the classifying; and modifying the query to boost the one or more categories when the confidence indicator associated with the one or more categories for one or more of the keywords of the query is greater than or equal to a confidence level threshold.

A system for processing a query is also disclosed. The system includes a server that includes a classifier builder that generates a classifier dictionary database that stores one or more keywords associated with one or more categories of products; a classifier that, in response to receiving a query, classifies the query into the one or more categories of products and determines a confidence indicator that indicates a probability that a term in the query is classified correctly, and when the confidence indicator is above a threshold, modifies the query prior to sending to a search engine and sends a modified query to the search engine, when the confidence indicator is below the threshold, sends the query to the search engine without modifying the query; and the search engine that receives the query or the modified query and identifies a result set based on the query or the modified query, wherein when the query is modified, the search engine orders the result set such that results in the one or more categories of products are ordered such that results in the one or more categories of products having a relatively higher confidence indicator are displayed at a beginning of the result set and results not in the one or more categories of products having the relatively higher confidence indicator are displayed relatively after the beginning of the list.

A search query processing system is also disclosed. The system includes a server that includes a classifier builder that generates a classifier dictionary database that stores one or more keywords associated with one or more categories of products; a classifier that, in response to receiving a query, classifies the query into the one or more categories of products and determines a confidence indicator that indicates a probability that a term in the query is classified correctly, and when the confidence indicator is above a threshold, modifies the query prior to sending to a search engine and sends a modified query to the search engine, when the confidence indicator is below the threshold, sends the query to the search engine without modifying the query; and the search engine that receives the query or the modified query and identifies a result set based on the query or the modified query, wherein when the query is modified, the search engine orders the result set such that results in the one or more categories of products are ordered such that results in the one or more categories of products having a relatively higher confidence indicator are displayed at a beginning of the result set and results not in the one or more categories of products having the relatively higher confidence indicator are displayed relatively after the beginning of the list, and the search engine sends the result set to a user device over a network for display on the user device.

A search query processing system is also disclosed. The system includes a server connectable to a user device over a network. The server includes a receiving means for receiving a query from the user device over the network; a classifier building means that generates a classifier dictionary database storing one or more keywords associated with one or more categories of products; a classifier means that, in response to receiving the query, classifies the query into the one or more categories of products and determines a confidence indicator that indicates a probability that a term in the query is classified correctly; when the confidence indicator is above a threshold, modifies the query and sends a modified query to a search engine; and when the confidence indicator is below the threshold, sends the query to the search engine without modifying the query; and the search engine that receives the query or the modified query and identifies a result set based on the query or the modified query, wherein when the query is modified, the search engine orders the result set such that results in the one or more categories of products are ordered such that results in the one or more categories of products having a relatively higher confidence indicator are displayed at a beginning of the result set and results not in the one or more categories of products having the relatively higher confidence indicator are displayed relatively after the beginning of the list; and a sending means to send the result set to the user device over the network for display on the user device.

BRIEF DESCRIPTION OF THE DRAWINGS

References are made to the accompanying drawings that form a part of this disclosure, and which illustrate embodiments in which the systems and methods described in this specification can be practiced.

Like reference numbers represent like parts throughout.

DETAILED DESCRIPTION

Figure 1:
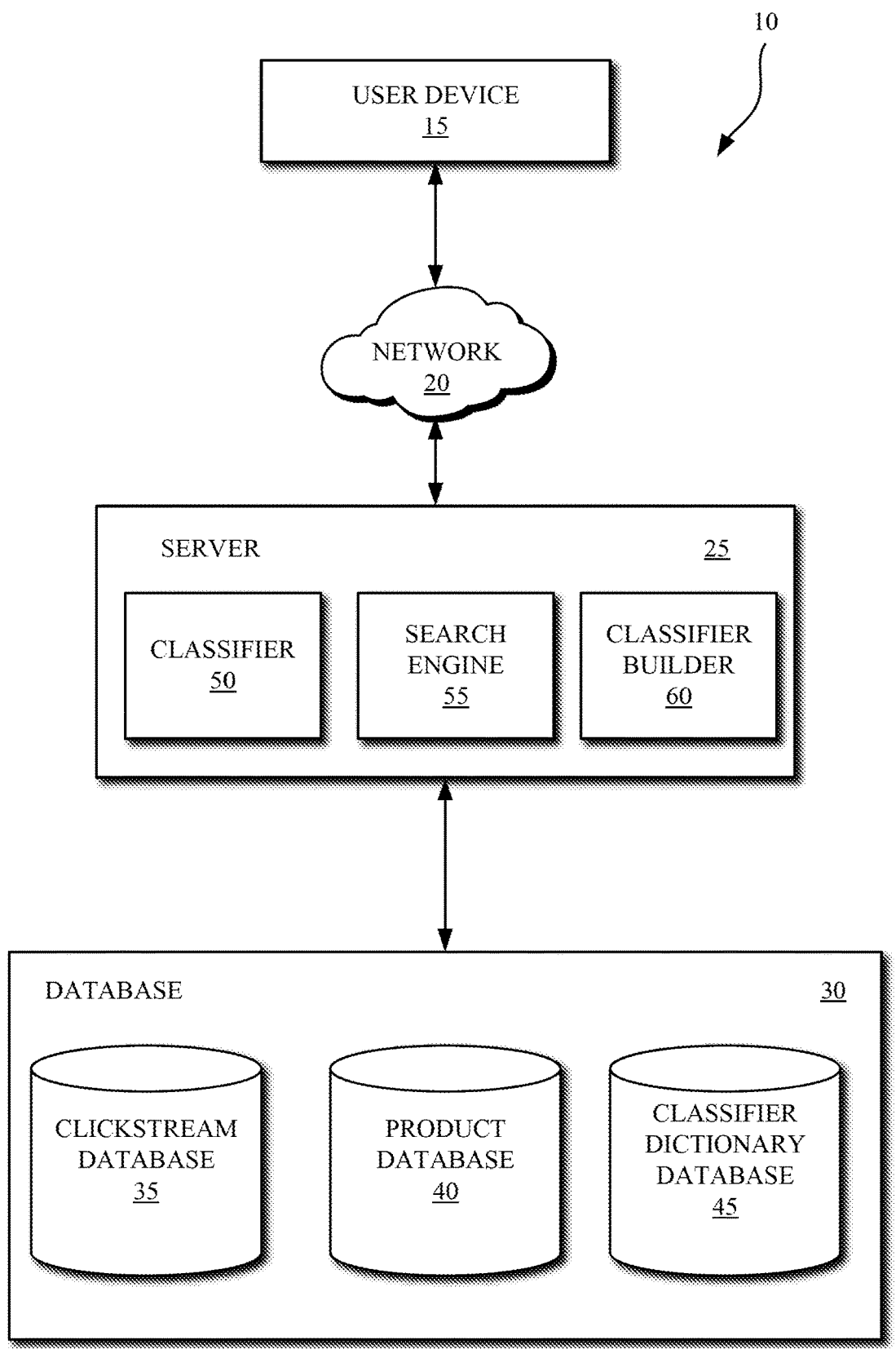
FIG. 1 is a schematic diagram of a query classifier system, according to an embodiment.

This disclosure relates generally to query classifying. More specifically, the disclosure relates to a method and process for classifying a query for improving speed and accuracy of search results in a search engine.

A retail website can include a search engine. A search engine generally refers to a software system that enables searching of information in a particular location. For example, a search engine for a retail website can be used by a website visitor to search through an inventory of products that are available from the retailer (e.g., one or more products that are available for purchase via the website, in a retail store of the retailer, or a combination thereof, etc.). When a website visitor performs a search using the search engine, the visitor's search is often referred to as the visitor's "query." A query, as used herein, generally includes one or more keywords which are input into a search input of the search engine. In this specification, a query entered by the user may alternatively be referred to as a search entered by the visitor, a visitor's search, or the like.

In a search engine for a retail website (e.g., an e-commerce search engine), a query classifier can be used to, for example, increase relevance of search results provided to a visitor of the retail website. This can be accomplished by classifying a query from the visitor into a category in which the items provided in the search results are most relevant to the query. The search engine can then use the classification information to search the category for the matching item. For example, if the visitor searches for "green apple," the query can be classified into a "grocery" category that includes many varieties of apples. If the visitor searches for "gold apple," the query can be classified into an "electronics" category that includes many varieties of products available from Apple, Inc. that are gold in color.

In an embodiment, a query classifier can be used to predict multiple categories and sub-categories for a query, ranking the categories and sub-categories based on a confidence indicator. The ranking of categories and sub-categories can be provided to the search engine such that a category or sub-category with a relatively higher confidence indicator can be searched first, followed by categories or sub-categories with relatively lower confidence indicators. This can, for example, lead to a search result set that includes results that are relatively more relevant to the search query first, with relatively less relevant search results being returned at a later part of the search results. In an embodiment, providing the more relevant search results to a website visitor first can, for example, lead to an increased level of sales.

In an embodiment, a confidence indicator can be normalized to, for example, lead to a mixing of search results when the query classifier identifies multiple categories having confidence indicators that are the same or substantially similar. Normalizing the confidence indicator can, for example, include bringing a confidence indicator for a particular category into alignment with the other confidence indicators.

In an embodiment, the query classifier can predict a confidence indicator for each category and sub-category. In such an embodiment, a query can be hierarchically classified separately based on the category and sub-category identified.

In an embodiment, the query classifier can be triggered based on a number of words in a query and the confidence indicator. This can, for example, increase relevancy of a result set for queries having a variety of numbers of words. In an embodiment, if the confidence indicator does not satisfy a threshold confidence level, the query classifier may not be applied.

FIG. 1 is a schematic diagram of a query classifier system 10, according to an embodiment. The system 10 includes a server 25 in communication with a user device 15 via a network 20.

The server 25 can make search results available to the user device 15. The server 25 can make the search results available to the user device over the network 20. In an embodiment, the server 25 can make a graphical user interface (GUI) (not shown) for performing a search of an inventory of items available from a retailer (e.g., via the retailer's website or via the retailer's store in instances in which the retailer also has a retail store) available to the user device 15 over the network 20 in accordance with generally known principles. It will be appreciated that the GUI may be made available by a server or servers that is/are separate (not shown) from the server 25. In an embodiment, aspects of the server 25 can be the same as or similar to aspects of server device 535 as shown and described in accordance with FIG. 3 below.

The network 20 can generally represent the Internet. In an embodiment, the network 20 can include, for example, a local area network (LAN), a wide area network (WAN), a wireless network, a cellular data network, or the like. In an embodiment, aspects of the network 20 can be the same as or similar to aspects of network 540 as shown and described in accordance with FIG. 3 below.

A website visitor can search an inventory of items available for purchase from a retailer (e.g., either from the retailer's website or from the retailer's store) via the user device 15. Examples of the user device 15 include, but are not limited to, a personal computer (PC), a laptop computer, a mobile device (e.g., a smartphone, a personal digital assistant (PDA), a tablet-style device, etc.), a wearable mobile device (e.g., a smart watch, head wearable device, etc.), or the like. A GUI for searching the inventory of items sold by the retailer is displayed on a display of the user device 15. Examples of the display for the user device 15 include, but are not limited to, a monitor connected to a PC, a laptop screen, a mobile device screen, a tablet screen, or the like. In an embodiment, aspects of the user device 15 can be the same as or similar to aspects of user devices 501 as shown and described in accordance with FIG. 3 below.

The server 25 is in communication with a database 30. The database 30 generally includes a variety of information on click and sales data from a retailer, such as the clickstream database 35. The click and sales data can include, for example, a listing of searches performed by website visitors, along with clicks the website visitors performed in response to those searches (e.g., which products the website visitors clicked on from the search results, etc.), whether the website visitors added any products from the search results to a shopping cart for purchase, and which product(s) the website visitors ultimately added to the shopping cart for purchase. The clickstream database 35 can include click and sales data for a particular period of time. For example, in an embodiment, the clickstream database 35 can include click and sales data for the previous calendar year. The amount of click and sales data in the clickstream database 35 can vary. It will be appreciated that the amount of click and sales data can contribute to an accuracy of a classifier 50 (described in additional detail below). The clickstream database 35 can be updated automatically such that data for the particular period of time is included in the database, and older data (e.g., older than the selected period of time) may not be included in the clickstream database 35. The frequency at which the clickstream database 35 is updated can vary. The clickstream database 35 can include a large number of entries, and accordingly, can be time consuming to build.

The database 30 can include a variety of information on products available from the retailer, such as product database 40. In an embodiment, the products included in the product database 40 may be those products that are available from the retailer, including products that are available through the retailer's website or in a retail store of the retailer.

The database 30 further includes a classifier dictionary database 45. The classifier database 45 can store a listing of keywords and one or more categories associated with each of the keywords.

The database 30 can include additional information such as, but not limited to, a user history database, or the like. It will be appreciated that the databases 35-45 can alternatively be combined and that a structure of the database 30 is not intended to be limited to the illustrated embodiment. In an embodiment, the classifier dictionary database 45 may be created, for example, based on information that is available in the clickstream database 35 and/or the product database 40.

The server 25 includes a classifier means (e.g., a classifier 50), a search engine 55, and a classifier building means (e.g., a classifier builder 60). It will be appreciated that the server 25 can include fewer or additional aspects. For example, the server 25 can additionally include a GUI builder (not shown). In an embodiment, the server 25 can include a receiving means and/or a sending means (e.g., a network input/output as discussed in further detail in accordance with FIG. 3 below).

The classifier builder 60 can, for example, use information from the database 30 to build the classifier dictionary database 45, according to an embodiment. For example, the classifier builder 60 can extract data from the clickstream database 35 and assign categories to search terms based on clicks and conversions (e.g., cart adds, purchases, etc.) for a particular term. In an embodiment, a table or other database including possible categories can be stored in a memory of the server 25 or in the database 30. For example, in an embodiment a category can be "clothing," and the clothing category can include sub-categories "men's," boys," "girl's," "women's," etc.

The classifier builder 60 can build the classifier dictionary database on a periodic basis. For example, the classifier builder 60 can extract data and categorize the data on a weekly basis, daily basis, hourly basis, etc. In an embodiment a weekly basis may be preferred to provide a sufficient amount of data to inform the categorization that is not too expansive as categorizing the data takes time which is increased as the data amount increases.

The classifier 50 can be used to interpret a query and classify the query to one or more categories or sub-categories. The classifier 50 can include a confidence indicator that is used to boost potentially more relevant categories or sub-categories. The confidence indicator can be determined, for example, by calculating a distribution which is based on a number of clicks for a particular category based on a search result for a particular keyword and a number of cart adds for the particular category based on the search result for the particular keyword. For example, in an embodiment, the confidence indicator may be a number identified by summing clicks for a particular category based on a search result for a particular keyword and cart adds for the particular category based on the search result for the particular keyword. In an embodiment, cart adds can be weighted to have more significance than clicks.

The search engine 55 can be used to determine search results for a particular query. The search engine 55 can be provided with the visitor's search in the same manner as the search was input. For example, if a visitor searches for "green apples," the search engine 55 may be provided with a query "green apples" and return all products satisfying the query as a search results list. In an embodiment, the search engine 55 may be provided with a query that is modified based on the classifier 50. For example, if the classifier 50 identifies that the query "green apples" is searching for products which belong in a sub-category of "produce" within a category of "grocery," the classifier 50 may modify the query so that the search engine searches for "green apples" first within the produce sub-category, and next within the grocery category. As a result, the visitor may receive more relevant results than if the classifier 50 does not modify the query.

Figure 2:
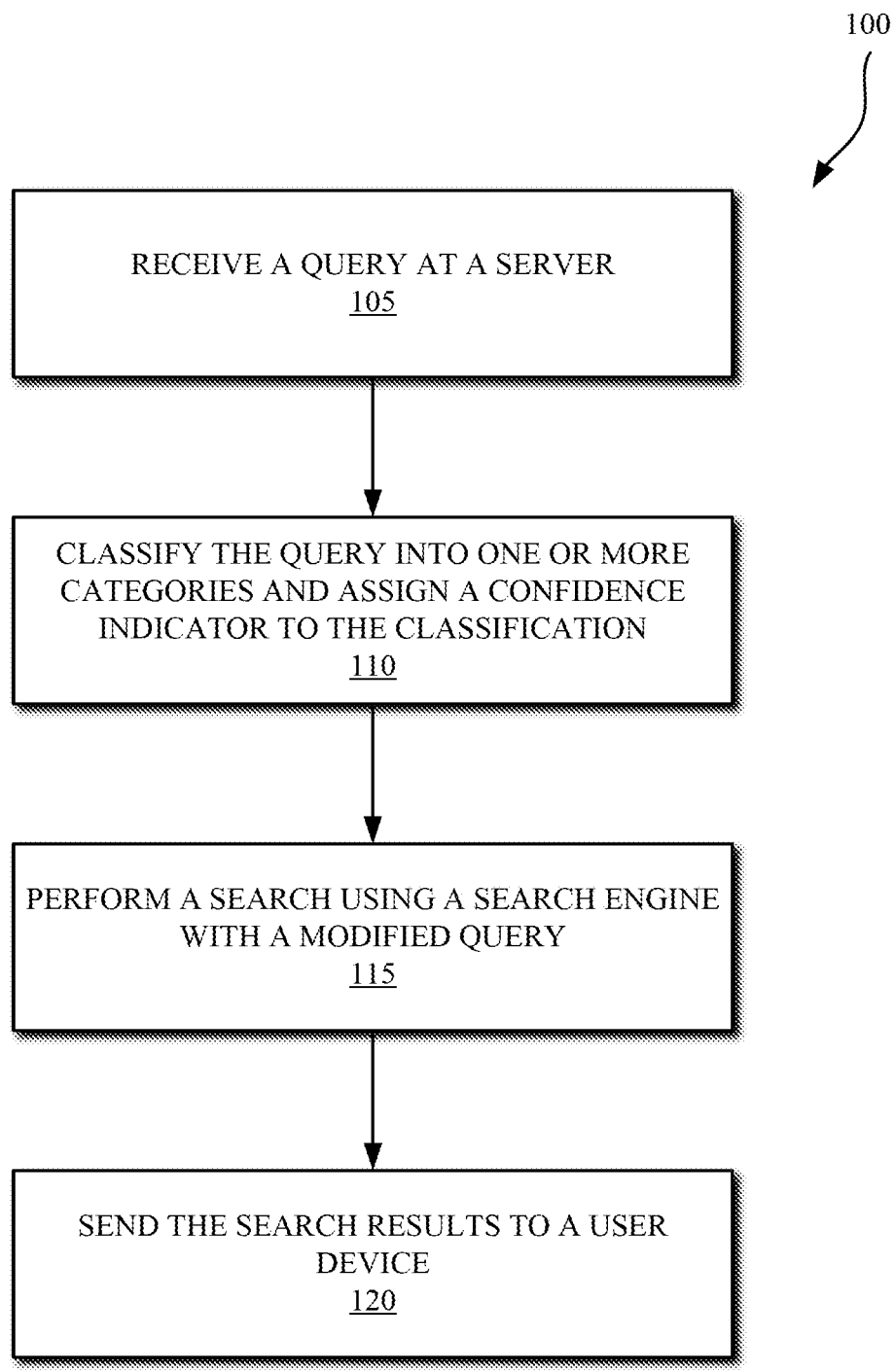
FIG. 2 is a flowchart of a method for processing a query, according to an embodiment.

FIG. 2 is a flowchart of a method 100 for processing a query, according to an embodiment. The method 100 generally corresponds to a process in which a query is processed when a system for processing the query includes a query classifier (e.g., the classifier 50 of FIG. 1). In an embodiment, the method 100 can provide a list of search results in response to the query that are relatively more relevant to an actual intent of a website visitor supplying the query than in absence of the classifier 50. In an embodiment, a list of search results can include a single search result.

At 105, the server 25 receives a query from the user device 15. The query can include one or more terms associated with one or more products which the website visitor would like to identify.

At 110, the classifier 50 can determine one or more categories associated with the query. The classifier 50 can start by attempting to identify a category for all words in the query. For example, if the query is N terms long (where N is an integer), the classifier 50 can predict a category using all N words. The classifier 50 can determine a confidence indicator based on, for example, a probability distribution determined from the classifier dictionary database 45. The probability distribution can, for example, indicate likelihood that the keyword is correctly categorized based on clickstream data in the clickstream database 35. For example, if a search for a t-shirt resulted in the website visitor adding an item to the cart that was in a category "clothing" and sub-category "men's clothing," the sub-category "men's clothing" may have a higher probability than if a search for a t-shirt only resulted in a viewing of an item in category "clothing," sub-category "boy's clothing." Once the category and confidence indicator are determined for the query including all N words, the classifier can drop the last word of the query and perform the classification and confidence indicator prediction again on the N-1 words of the query. Once the category and confidence indicator are determined for the query on the N-1 words, the classifier can drop the last word of the modified query and perform the classification and confidence indicator prediction again (on N-2 words of the query). This can continue until the classification and confidence indicator prediction are performed for the first word of the query alone (e.g., N-M, where N-M=1). The classification with the highest confidence indicator from the various classifications can then be used in submitting the modified query to the search engine 55. Alternatively, instead of proceeding sequentially, the query can be split into individual keywords and each of the individual keywords can be classified and a confidence indicator performed. The category with the highest confidence indicator can be ranked highest, with the category having the lowest confidence indicator being ranked lowest.

In an embodiment, context information (e.g., cookies identifying a user's previous searches, demographics, etc.) can also be used to modify a confidence indicator for a particular category. In an embodiment, if a confidence indicator is not above a particular threshold (e.g., 80% or higher, etc.), the classifier may not provide any categorizations and may use the query as received from the user in determining the search results.

At 115, the search engine 55 processes the query to identify the list of search results. In an embodiment, if at least one confidence indicator is above a confidence level threshold, the query may be modified prior to processing in order to first search for results in the corresponding category. In an embodiment, if at least one confidence indicator is not above a confidence level threshold, the query may be processed without modification. In an embodiment, if the confidence levels of the various categories identified are all relatively similar to each other, the search engine 55 may process the query and provide search results that are randomized. The search engine 55 can order the search results list based on the classification of 110. For example, the query may be parsed and provided to the search engine 55 in a manner that indicates that the search engine 55 first retrieve results from the category having the highest confidence indicator, next retrieve results from the next lower confidence indicator, etc. As a result, the search results list can be ordered in a manner in which the search results that are most relevant to the query are ordered relatively higher in the order than the search results that are less relevant to the query. As a result, the method 100 can, in an embodiment, improve likelihood that at least the search results ordered higher in the search results list capture an actual intent of the website visitor.

At 120, the server 25 sends the search results list to the user device 15 for display to the website visitor.

Figure 3:
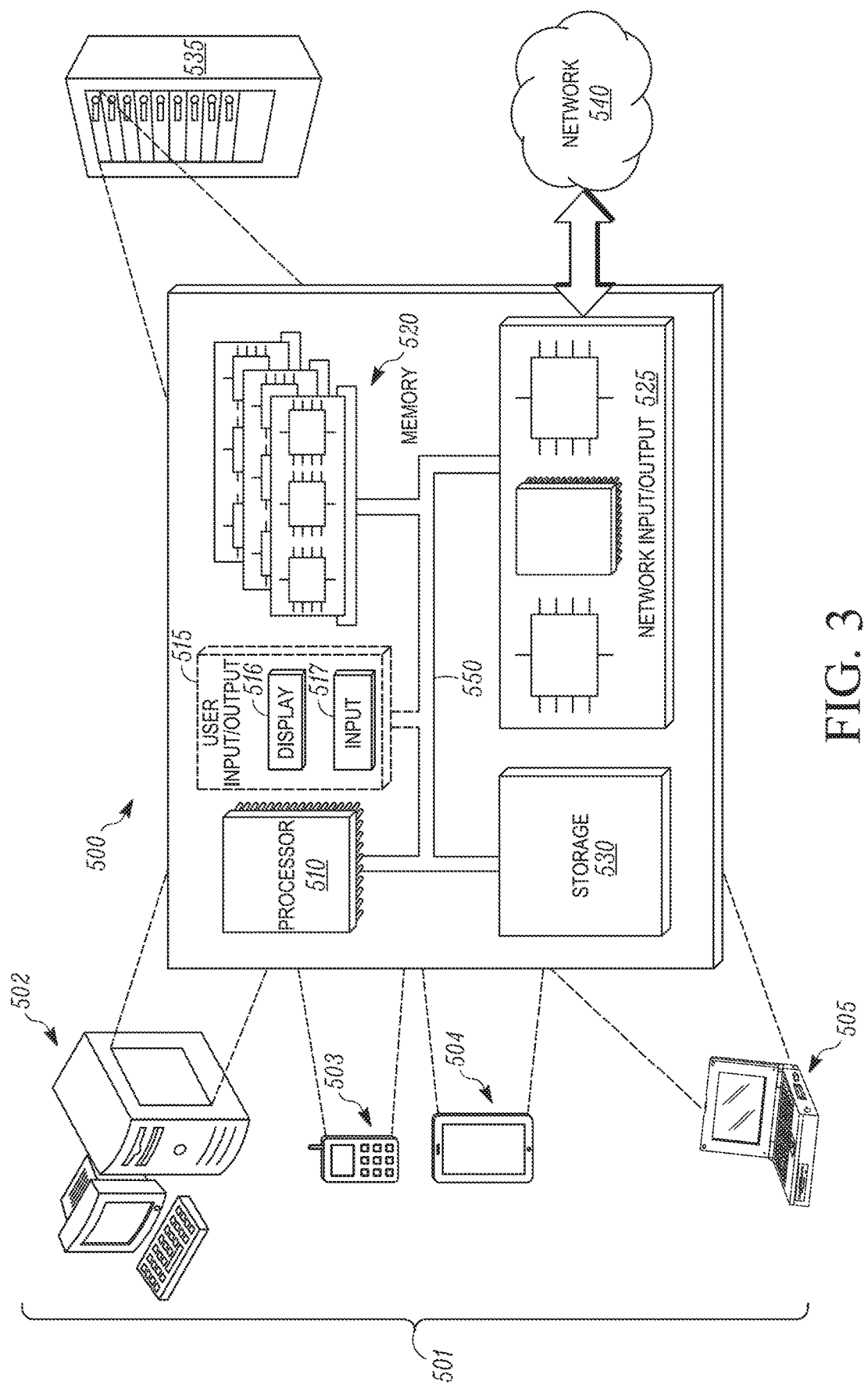
FIG. 3 is a schematic diagram of an architecture for a computer device 500, according to an embodiment.

FIG. 3 is a schematic diagram of an architecture for a computer device 500, according to an embodiment. The computer device 500 and any of the individual components thereof can be used for any of the operations described in accordance with any of the computer-implemented methods described herein.

The computer device 500 generally includes a processor 510, memory 520, a network input/output (I/O) 525, storage 530, and an interconnect 550. The computer device 500 can optionally include a user I/O 515, according to some embodiments. The computer device 500 can be in communication with one or more additional computer devices 500 through a network 540.

The computer device 500 is generally representative of hardware aspects of a variety of user devices 501 and a server device 535. The illustrated user devices 501 are examples and are not intended to be limiting. Examples of the user devices 501 include, but are not limited to, a desktop computer 502, a cellular/mobile phone 503, a tablet device 504, and a laptop computer 505. It is to be appreciated that the user devices 501 can include other devices such as, but not limited to, a personal digital assistant (PDA), a video game console, a television, or the like. In some embodiments, the user devices 501 can alternatively be referred to as client devices 501. In such embodiments, the client devices 501 can be in communication with the server device 535 through the network 540. One or more of the client devices 501 can be in communication with another of the client devices 501 through the network 540 in some embodiments.

The processor 510 can retrieve and execute programming instructions stored in the memory 520 and/or the storage 530. The processor 510 can also store and retrieve application data residing in the memory 520. The interconnect 550 is used to transmit programming instructions and/or application data between the processor 510, the user I/O 515, the memory 520, the storage 530, and the network I/O 540. The interconnect 550 can, for example, be one or more busses or the like. The processor 510 can be a single processor, multiple processors, or a single processor having multiple processing cores. In some embodiments, the processor 510 can be a single-threaded processor. In some embodiments, the processor 510 can be a multi-threaded processor.

The user I/O 515 can include a display 516 and/or an input 517, according to some embodiments. It is to be appreciated that the user I/O 515 can be one or more devices connected in communication with the computer device 500 that are physically separate from the computer device 500. For example, the display 516 and input 517 for the desktop computer 502 can be connected in communication but be physically separate from the computer device 500. In some embodiments, the display 516 and input 517 can be physically included with the computer device 500 for the desktop computer 502. In some embodiments, the user I/O 515 can physically be part of the user device 501. For example, the cellular/mobile phone 503, the tablet device 504, and the laptop 505 include the display 516 and input 517 that are part of the computer device 500. The server device 535 generally may not include the user I/O 515. In some embodiments, the server device 535 can be connected to the display 516 and input 517.

The display 516 can include any of a variety of display devices suitable for displaying information to the user. Examples of devices suitable for the display 516 include, but are not limited to, a cathode ray tube (CRT) monitor, a liquid crystal display (LCD) monitor, a light emitting diode (LED) monitor, or the like.

The input 517 can include any of a variety of input devices or means suitable for receiving an input from the user. Examples of devices suitable for the input 517 include, but are not limited to, a keyboard, a mouse, a trackball, a button, a voice command, a proximity sensor, an ocular sensing device for determining an input based on eye movements (e.g., scrolling based on an eye movement), or the like. It is to be appreciated that combinations of the foregoing inputs 517 can be included for the user devices 501. In some embodiments the input 517 can be integrated with the display 516 such that both input and output are performed by the display 516.

The memory 520 is generally included to be representative of a random access memory such as, but not limited to, Static Random Access Memory (SRAM), Dynamic Random Access Memory (DRAM), or Flash. In some embodiments, the memory 520 can be a volatile memory. In some embodiments, the memory 520 can be a non-volatile memory. In some embodiments, at least a portion of the memory can be virtual memory.

The storage 530 is generally included to be representative of a non-volatile memory such as, but not limited to, a hard disk drive, a solid state device, removable memory cards, optical storage, flash memory devices, network attached storage (NAS), or connections to storage area network (SAN) devices, or other similar devices that may store non-volatile data. In some embodiments, the storage 530 is a computer readable medium. In some embodiments, the storage 530 can include storage that is external to the computer device 500, such as in a cloud.

The network I/O 525 is configured to transmit data via a network 540. The network 540 may alternatively be referred to as the communications network 540. Examples of the network 540 include, but are not limited to, a local area network (LAN), a wide area network (WAN), the Internet, or the like. In some embodiments, the network I/O 525 can transmit data via the network 540 through a wireless connection using WiFi, Bluetooth, or other similar wireless communication protocols. In some embodiments, the computer device 500 can transmit data via the network 540 through a cellular, 3G, 4G, or other wireless protocol. In some embodiments, the network I/O 525 can transmit data via a wire line, an optical fiber cable, or the like. It is to be appreciated that the network I/O 525 can communicate through the network 540 through suitable combinations of the preceding wired and wireless communication methods.

The server device 535 is generally representative of a computer device 500 that can, for example, respond to requests received via the network 540 to provide, for example, data for rendering a website on the user devices 501. The server 535 can be representative of a data server, an application server, an Internet server, or the like.

Aspects described herein can be embodied as a system, method, or a computer readable medium. In some embodiments, the aspects described can be implemented in hardware, software (including firmware or the like), or combinations thereof. Some aspects can be implemented in a non-transitory, tangible computer readable medium, including computer readable instructions for execution by a processor. Any combination of one or more computer readable medium(s) can be used.

The computer readable medium can include a computer readable signal medium and/or a computer readable storage medium. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result. Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing. A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

Some embodiments can be provided to an end-user through a cloud-computing infrastructure. Cloud computing generally includes the provision of scalable computing resources as a service over a network (e.g., the Internet or the like).

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary.

Aspect 1. A computer-implemented method for processing a query, the method comprising:
  receiving, by a server, a query from a user device over a network, the query including one or more keywords;
  classifying, by the server, the query into one or more categories based on the one or more keywords of the query;
  determining, by the server, a confidence indicator associated with each of the one or more categories from the classifying; and
  modifying the query to boost the one or more categories when the confidence indicator associated with the one or more categories for one or more of the keywords of the query is greater than or equal to a confidence level threshold.

Aspect 2. The computer-implemented method according to aspect 1, further comprising:
submitting the query as modified to a search engine, wherein the confidence indicator associated with the one or more categories that are greater than the threshold are prioritized such that a results set returned by the search engine orders the results set based on a hierarchy of the one or more categories.

Aspect 3. The computer-implemented method according to any one of aspects 1-2, further comprising sending the results set to the user device over the network.

Aspect 4. The computer-implemented method according to any one of aspects 1-3, wherein the one or more categories and the confidence indicator associated with the one or more categories is determined from previous search and click data.

Aspect 5. The computer-implemented method according to any one of aspects 1-4, wherein classifying the query into one or more categories includes classifying each of the one or more keywords of the query into one or more categories, wherein the query includes N keywords, and repeating the classifying after dropping a last term of the query.

Aspect 6. The computer-implemented method according to any one of aspects 1-5, further comprising repeating the classifying after dropping the last term of the query until each of the one or more keywords is classified on its own.

Aspect 7. The computer-implemented method according to any one of aspects 1-6, wherein when the confidence indicator is less than the threshold the query is submitted to a search engine as received without providing the one or more categories to the search engine.

Aspect 8. A system for processing a search query, comprising:
a server that includes:
a classifier builder that generates a classifier dictionary database that stores one or more keywords associated with one or more categories of products;
a classifier that, in response to receiving a query, classifies the query into the one or more categories of products and determines a confidence indicator that indicates a probability that a term in the query is classified correctly, and when the confidence indicator is above a threshold, modifies the query prior to sending to a search engine and sends a modified query to the search engine, when the confidence indicator is below the threshold, sends the query to the search engine without modifying the query; and
the search engine that receives the query or the modified query and identifies a result set based on the query or the modified query, wherein when the query is modified, the search engine orders the result set such that results in the one or more categories of products are ordered such that results in the one or more categories of products having a relatively higher confidence indicator are displayed at a beginning of the result set and results not in the one or more categories of products having the relatively higher confidence indicator are displayed relatively after the beginning of the list.

Aspect 9. The system according to aspect 8, wherein the server is connectable to a user device over a network and can receive the query from the user device.

Aspect 10. The system according to any one of aspects 8-9, wherein the server is connectable to the user device and can send the result set to the user device.

Aspect 11. The system according to any one of aspects 8-10, wherein the classifier builder generates the classifier dictionary database based on search and click data stored in a clickstream database.

Aspect 12. The system according to any one of aspects 8-11, wherein the query has a length of N terms, N is an integer, and the classifier can classify the query into the one or more categories of products based on all N terms.

Aspect 13. The system according to any one of aspects 8-12, wherein the query has a length of N terms, N is an integer, and the classifier can classify the query into the one or more categories of products based on all N terms, and can classify the query into the one or more categories of products based on N−1 terms, and repeats until N−1 is 1.

Aspect 14. The system according to any one of aspects 8-13, wherein the confidence indicator is based on context information receivable from the user device.

What is claimed is:

1. A computer-implemented method of processing a query, the method comprising:
receiving, by a server, a query from a user device over a network, the query including two or more keywords;
classifying, by the server, the query into one or more categories based on the two or more keywords of the query;
determining, by the server, a confidence indicator associated with each of the one or more categories from the classifying;
modifying the query to boost the one or more categories when the confidence indicator associated with the one or more categories for two or more of the keywords of the query is greater than or equal to a confidence level threshold;
modifying the confidence indicator based on context information including at least one of cookies identifying a user's previous searches and demographic data; and
submitting the query as modified to a search engine, wherein the confidence indicator associated with the one or more categories that are greater than the confidence level threshold is prioritized such that a results set returned by the search engine orders the results set based on a hierarchy of the one or more categories,
wherein when the confidence indicator is less than the confidence level threshold the query is submitted to the search engine as received without providing the one or more categories to the search engine, wherein the confidence level threshold is a percentage greater than zero and less than 100,
wherein the confidence indicator is determined by calculating a distribution based on a number of clicks for a particular category based on a search result for a particular keyword of the two or more keywords and a number of cart adds for the particular category based on the search result for the particular keyword.

2. The computer-implemented method according to claim 1, further comprising sending the results set to the user device over the network.

3. The computer-implemented method according to claim 1, wherein the one or more categories and the confidence indicator associated with the one or more categories is determined from previous search and click data.

4. The computer-implemented method according to claim 1, wherein classifying the query into one or more categories includes classifying each of the two or more keywords of the query into one or more categories, wherein the query includes N keywords, and repeating the classifying after dropping a last term of the query until N−1 is 1.

5. The computer-implemented method according to claim 4, further comprising repeating the classifying after dropping the last term of the query until each of the two or more keywords is classified on its own.

6. The computer-implemented method according to claim 1, wherein the confidence indicator is a number calculated by summing clicks for a particular category based on a search result for a particular keyword and cart adds for the particular category based on the search result for the particular keyword.

7. The computer-implemented method according to claim 1, further comprising building, by the server, a classifier dictionary database storing two or more keywords associated with one or more categories, wherein the clickstream dictionary database is automatically updated such that data for a particular period of time is included in the database and data older than the particular period of time is not included in the clickstream database.

8. A search query processing system, comprising:
a server having one or more hardware processors and a memory storing instructions that when executed by the one or more hardware processors includes:
a classifier builder that generates a classifier dictionary database that stores two or more keywords associated with one or more categories of products;
a classifier that, in response to receiving a query, classifies the query into the one or more categories of products and determines a confidence indicator that indicates a probability that a term in the query is classified correctly, and when the confidence indicator is above a threshold, modifies the query prior to sending to a search engine and sends a modified query to the search engine, when the confidence indicator is below the threshold, sends the query to the search engine without modifying the query, wherein the confidence level threshold is a percentage greater than zero and less than 100 wherein the confidence indicator is determined by calculating a distribution based on a number of clicks for a particular category based on a search result for a particular keyword of the two or more keywords and a number of cart adds for the particular category based on the search result for the particular keyword, and wherein the confidence indicator is modified based on context information including at least one of cookies identifying a user's previous searches and demographic data; and
the search engine that receives the query or the modified query and identifies a result set based on the query or the modified query, wherein when the query is modified, the search engine orders the result set such that results in the one or more categories of products are ordered such that results in the one or more categories of products having a relatively higher confidence indicator are displayed at a beginning of the result set and results not in the one or more categories of products having the relatively higher confidence indicator are displayed relatively after the beginning of the list, and the search engine sends the result set to a user device over a network for display on the user device.

9. The system according to claim 8, wherein the server can receive the query from the user device.

10. The system according to claim 8, wherein the server is connectable to a clickstream database over the network.

11. The system according to claim 10, wherein the classifier builder generates the classifier dictionary database based on search and click data stored in the clickstream database.

12. The system according to claim 8, wherein the query has a length of N terms, N is an integer, and the classifier can classify the query into the one or more categories of products based on all N terms.

13. The system according to claim 8, wherein the query has a length of N terms, N is an integer, and the classifier can classify the query into the one or more categories of products based on all N terms, and can classify the query into the one or more categories of products based on N−1 terms, and repeats until N−1 is 1.

14. The system according to claim 8, wherein the confidence indicator is based on context information receivable from the user device.

15. A search query processing system, comprising:
a server connectable to a user device over a network, the server having one or more hardware processors and a memory storing instructions that when executed by the one or more hardware processors, the server including:
a receiver that receives a query from the user device over the network;
a classifier builder that generates a classifier dictionary database storing two or more keywords associated with one or more categories of products;
a classifier that, in response to receiving the query, classifies the query into the one or more categories of products and determines a confidence indicator that indicates a probability that a term in the query is classified correctly; when the confidence indicator is above a threshold, modifies the query and sends a modified query to a search engine; and when the confidence indicator is below the threshold, sends the query to the search engine without modifying the query, wherein the confidence level threshold is a percentage greater than zero and less than 100, wherein the confidence indicator is determined by calculating a distribution based on a number of clicks for a particular category based on a search result for a particular keyword of the two or more keywords and a number of cart adds for the particular category based on the search result for the particular keyword, and wherein the confidence indicator is modified based on context information including at least one of cookies identifying a user's previous searches and demographic data;
the search engine that receives the query or the modified query and identifies a result set based on the query or the modified query, wherein when the query is modified, the search engine orders the result set such that results in the one or more categories of products are ordered such that results in the one or more categories of products having a relatively higher confidence indicator are displayed at a beginning of the result set and results not in the one or more categories of products having the relatively higher confidence indicator are displayed relatively after the beginning of the list; and
a sender to send the result set to the user device over the network for display on the user device.

16. The search query processing system according to claim 15, wherein the server is connectable to a clickstream database over the network.

17. The search query processing system according to claim 16, wherein the classifier builder generates the classifier dictionary database based on search and click data stored in the clickstream database.

18. The search query processing system according to claim 15, wherein the query has a length of N terms, N is an integer, and the classifier classifies the query into the one or more categories of products based on all N terms.

19. The search query processing system according to claim 15, wherein the query has a length of N terms, N is an integer, and the classifier classifies the query into the one or more categories of products based on all N terms, and classifies the query into the one or more categories of products based on N−1 terms, and repeats until N−1 is 1.

20. The search query processing system according to claim 15, wherein the confidence indicator is based on context information receivable from the user device over the network.

\* \* \* \* \*